US012591253B2

(12) United States Patent (10) Patent No.: US 12,591,253 B2
Watanabe et al. (45) Date of Patent: Mar. 31, 2026

(54) AUTONOMOUS MOVING SYSTEM, AUTONOMOUS MOVING METHOD, AND STORAGE MEDIUM

(71) Applicant: TOYOTA JIDOSHA KABUSHIKI KAISHA, Toyota (JP)

(72) Inventors: Yuta Watanabe, Toyota (JP); Shiro Oda, Anjo (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 18/594,038

(22) Filed: Mar. 4, 2024

(65) Prior Publication Data

US 2024/0353859 A1 Oct. 24, 2024

(30) Foreign Application Priority Data

Apr. 18, 2023 (JP) ................................. 2023-067516

(51) Int. Cl.
  *G05D 1/622* (2024.01)
  *G05D 105/28* (2024.01)
  (Continued)

(52) U.S. Cl.
  CPC .......... *G05D 1/637* (2024.01); *G05D 2105/28* (2024.01); *G05D 2107/65* (2024.01); *G05D 2111/10* (2024.01)

(58) Field of Classification Search
  CPC .............................................. G05D 1/00–087
  See application file for complete search history.

(56) References Cited

U.S. PATENT DOCUMENTS

2013/0034286 A1  2/2013  Vija et al.
2014/0031981 A1  1/2014  Fernando et al.
         (Continued)

FOREIGN PATENT DOCUMENTS

JP    2016-095703 A    5/2016
JP    2021-086217 A    6/2021
         (Continued)

OTHER PUBLICATIONS

Sep. 16, 2025 Office Action issued in U.S. Appl. No. 18/599,354.
U.S. Appl. No. 18/599,354, filed Mar. 8, 2024.

*Primary Examiner* — Aaron L Troost
(74) *Attorney, Agent, or Firm* — Oliff PLC

(57) ABSTRACT

An autonomous moving system according to the present disclosure is an autonomous moving system including an autonomous moving body that moves autonomously. The autonomous moving system includes a control unit that executes control of movement of the autonomous moving body including collision control, a setting unit that sets a defense space around the autonomous moving body, for executing the collision control, a detecting unit that detects obstructions in a vicinity of the autonomous moving body, and a classifying unit that classifies obstructions that are detected. The setting unit changes a range of the defense space, based on the obstructions that are classified by the classifying unit, and the control unit executes control of movement of the autonomous moving body including the collision control in at least one of when the obstruction is inside the defense space and when the obstruction is predicted to enter the defense space.

15 Claims, 10 Drawing Sheets

(51) Int. Cl.
  *G05D 107/60*    (2024.01)
  *G05D 111/10*    (2024.01)

(56)      References Cited

U.S. PATENT DOCUMENTS

| | | | |
|---|---|---|---|
| 2016/0125268 A1 | 5/2016 | Ebiyama | |
| 2017/0315559 A1 | 11/2017 | Etoh | |
| 2019/0113916 A1* | 4/2019 | Guo | A61B 5/6893 |
| 2019/0329729 A1 | 10/2019 | Hilligardt et al. | |
| 2020/0223431 A1 | 7/2020 | Zass | |
| 2021/0042592 A1 | 2/2021 | Hashimoto et al. | |
| 2021/0157326 A1 | 5/2021 | Takai et al. | |
| 2021/0260764 A1* | 8/2021 | Paschall, II | G05D 1/246 |
| 2021/0346557 A1* | 11/2021 | Brooks | G02B 3/08 |
| 2022/0206503 A1* | 6/2022 | Taira | G05D 1/0246 |
| 2023/0020135 A1* | 1/2023 | Ferguson | G08G 5/56 |
| 2023/0066510 A1 | 3/2023 | Yasunaga et al. | |
| 2023/0152811 A1 | 5/2023 | Watanabe et al. | |
| 2024/0353860 A1 | 10/2024 | Watanabe et al. | |

FOREIGN PATENT DOCUMENTS

| | | |
|---|---|---|
| JP | 2022-094178 A | 6/2022 |
| JP | 2023-036418 A | 3/2023 |
| JP | 2023-072145 A | 5/2023 |
| WO | 2013/046563 A1 | 4/2013 |

\* cited by examiner

1

200

MANAGEMENT DEVICE

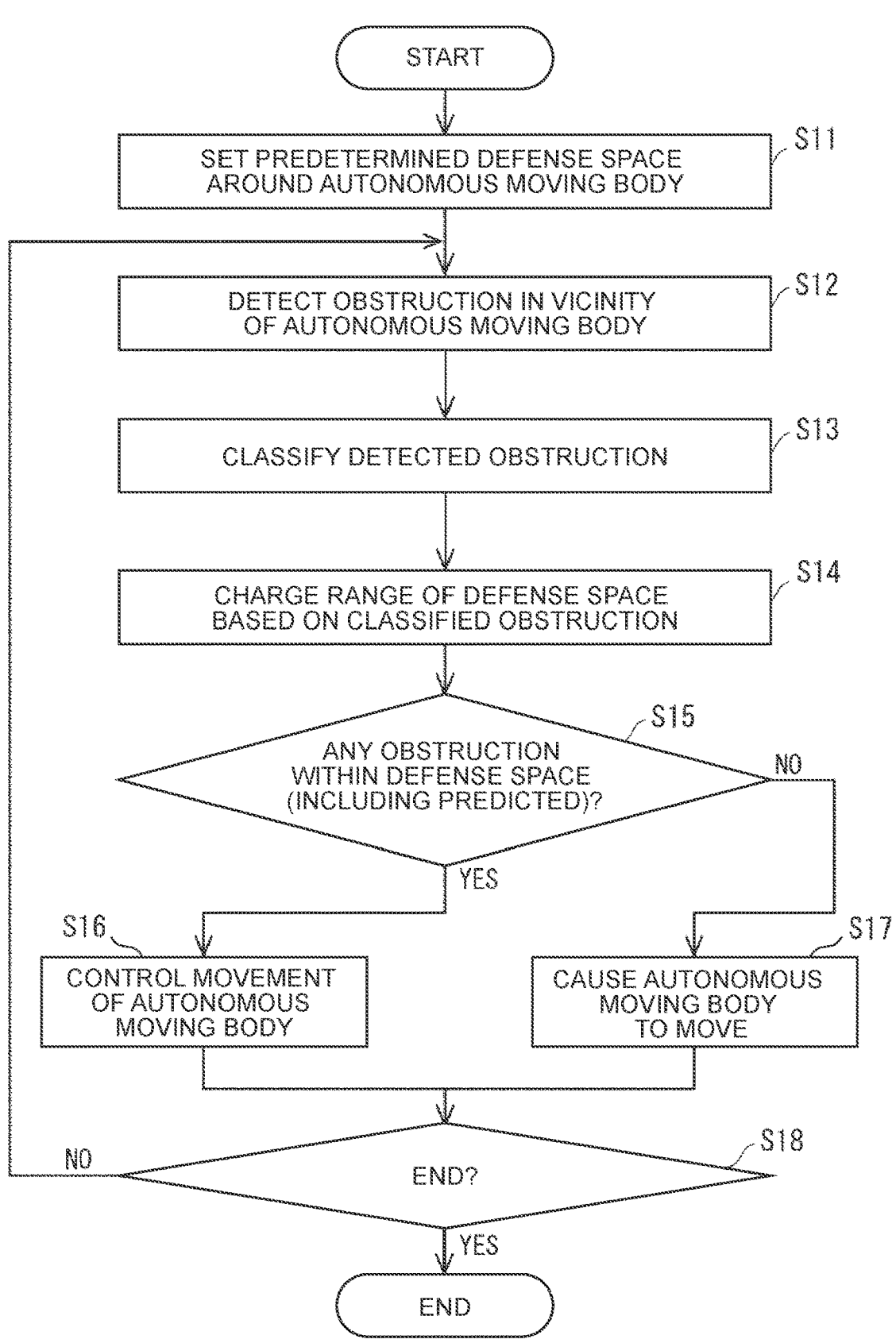

START

SET PREDETERMINED DEFENSE SPACE
AROUND AUTONOMOUS MOVING BODY — S11

DETECT OBSTRUCTION IN VICINITY
OF AUTONOMOUS MOVING BODY — S12

CLASSIFY DETECTED OBSTRUCTION — S13

CHARGE RANGE OF DEFENSE SPACE
BASED ON CLASSIFIED OBSTRUCTION — S14

ANY OBSTRUCTION
WITHIN DEFENSE SPACE
(INCLUDING PREDICTED)? — S15

NO

YES

S16 — CONTROL MOVEMENT
OF AUTONOMOUS
MOVING BODY

CAUSE AUTONOMOUS
MOVING BODY
TO MOVE — S17

NO

END? — S18

YES

END

AUTONOMOUS MOVING SYSTEM, AUTONOMOUS MOVING METHOD, AND STORAGE MEDIUM

CROSS-REFERENCE TO RELATED APPLICATION

This application claims priority to Japanese Patent Application No. 2023-067516 filed on Apr. 18, 2023, incorporated herein by reference in its entirety.

BACKGROUND

1. Technical Field

The present disclosure relates to an autonomous moving system, an autonomous moving method, and a storage medium.

2. Description of Related Art

Japanese Unexamined Patent Application Publication No. 2021-086217 (JP 2021-086217 A) discloses an autonomous moving system including an autonomous moving body. The autonomous moving body disclosed in JP 2021-086217 A is equipped with a sensor that detects obstructions in a vicinity of the autonomous moving body, and sets an entry-prohibited space and an entry-restricted space. When the sensor detects an obstruction entering the entry-restricted space, the autonomous moving body reduces the movement speed thereof, executes an avoidance action, or the like.

SUMMARY

Although JP 2021-086217 A describes that when an autonomous moving body starts moving, notification is given to the surroundings by audio or LED, but does not describe an action to avoid obstructions when starting to move. Even when an obstruction is present near the autonomous moving body, the autonomous moving body will start moving as long as the obstruction is outside the entry-prohibited space of the autonomous moving body. Accordingly, when an obstruction located near the entry-prohibited space moves immediately after the autonomous moving body starts to move, there is a possibility that it will collide with the autonomous moving body.

Also, when an obstruction is present in the entry-prohibited space of the autonomous moving body is stopped, the autonomous moving body may not be able to start moving until the obstruction moves away. In order for the autonomous moving body to start moving without mechanical interference with obstructions, it is desirable to comprehend the situation in the vicinity of the autonomous moving body, such as the movement of obstructions, and to change actions, such as starting to move and stopping, in accordance with the situation.

The present disclosure provides an autonomous moving system, an autonomous moving method, and an autonomous moving program, in which actions can be changed depending on the situation.

An autonomous moving system according to an aspect of the present disclosure is an autonomous moving system including an autonomous moving body that moves autonomously. The autonomous moving system includes a control unit that executes control of movement of the autonomous moving body, including collision control of at least one of control to avoid a collision between the autonomous moving body and an obstruction and control to mitigate damage upon a collision, a setting unit that sets a predetermined defense space around the autonomous moving body, for executing the collision control by the control unit, a detecting unit that detects an obstruction in a vicinity of the autonomous moving body, and a classifying unit that classifies the obstruction that is detected. The setting unit changes a range of the defense space, based on the obstructions that are classified by the classifying unit, and the control unit executes control of movement of the autonomous moving body including the collision control in at least one of when the obstruction is inside the defense space and when the obstruction is predicted to enter inside the defense space.

In the above autonomous moving system, the movement of the autonomous moving body may include the autonomous moving body starting to move, and the control unit may stop the autonomous moving body from starting to move, based on the obstruction classified by the classifying unit.

In the above autonomous moving system, the detecting unit may acquire information of the obstruction from at least one of a sensor and a camera installed in the autonomous moving body, and a facility sensor and a facility camera installed in a facility space through which the autonomous moving body moves.

In the above autonomous moving system, the classifying unit may classify the obstruction detected by the detecting unit, by using an algorithm that is subjected to machine learning using the obstruction as training data.

In the above autonomous moving system, when the classifying unit classifies the obstruction as a wall, the setting unit may exclude a portion of the wall of the defense space from the defense space.

In the above autonomous moving system, when the classifying unit classifies the obstruction as a wheelchair, the setting unit may reduce a width of the defense space on a wheelchair side, and increase the width of the defense space on an opposite side from the wheelchair.

In the above autonomous moving system, when the classifying unit classifies the obstruction as the wheelchair in a state of being stopped for a predetermined amount of time, the setting unit may exclude a portion of the wheelchair of the defense space from the defense space.

In the above autonomous moving system, when the classifying unit classifies the obstruction as the wheelchair that a person is riding, the control unit may cause the autonomous moving body to move away from the wheelchair.

In the above autonomous moving system, when the classifying unit classifies the obstruction as a stretcher, the setting unit may enlarge the defense space, and the control unit may cause the autonomous moving body to move out of a space through which the stretcher passes, in a direction in which the stretcher advances.

The above autonomous moving system may further include a storage unit storing map information of a facility space through which the autonomous moving body moves, and the classifying unit may classify the obstruction that is detected, based on the map information acquired from the storage unit.

An autonomous moving method according to an aspect of the present disclosure is an autonomous moving method for an autonomous moving body that moves autonomously. The autonomous moving method includes setting a predetermined defense space around the autonomous moving body, for executing collision control of at least one of control to avoid a collision between the autonomous moving body and an obstruction and control to mitigate damage upon a collision, detecting an obstruction in a vicinity of the autonomous moving body, classifying the obstruction that is detected, changing a range of the defense space based on the obstruction that is classified, and executing control of movement of the autonomous moving body including the collision control in at least one of when the obstruction is inside the defense space and when the obstruction is predicted to enter inside the defense space.

A storage medium according to an aspect of the present disclosure stores instructions that are executable by one or more processors and that cause the one or more processors to perform functions. The functions are that an autonomous moving program for an autonomous moving body that autonomously moves causes a computer to execute setting a predetermined defense space around the autonomous moving body, for executing collision control of at least one of control to avoid a collision between the autonomous moving body and an obstruction and control to mitigate damage upon a collision, detecting an obstruction in a vicinity of the autonomous moving body, classifying the obstruction that is detected, changing a range of the defense space based on the obstruction that is classified, and executing control of movement of the autonomous moving body including the collision control in at least one of when the obstruction is inside the defense space and when the obstruction is predicted to enter inside the defense space.

According to the present disclosure, an autonomous moving system, in which actions can be changed depending on the situation, can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a flowchart exemplifying an autonomous moving method for the autonomous moving body according to the first embodiment.

DETAILED DESCRIPTION OF EMBODIMENTS

A specific configuration of embodiments will be described below with reference to the drawings. The following description illustrates preferred embodiments of the present disclosure, and the scope of the present disclosure is not limited to the following embodiments. Also, all the configurations described in the present embodiment are not necessarily essential as means for solving the problem. In order to clarify description, omissions and simplification have been made as appropriate in the following description and the drawings. In each drawing, the same elements are denoted by the same signs, and redundant description will be omitted as necessary.

First Embodiment

An autonomous moving system according to a first embodiment will be described. In the present embodiment, the autonomous moving system may be replaced with an autonomous moving body, and the autonomous moving body may be replaced with the autonomous moving system. Also, the autonomous moving system according to the present embodiment may include the autonomous moving body.

Figure 1:
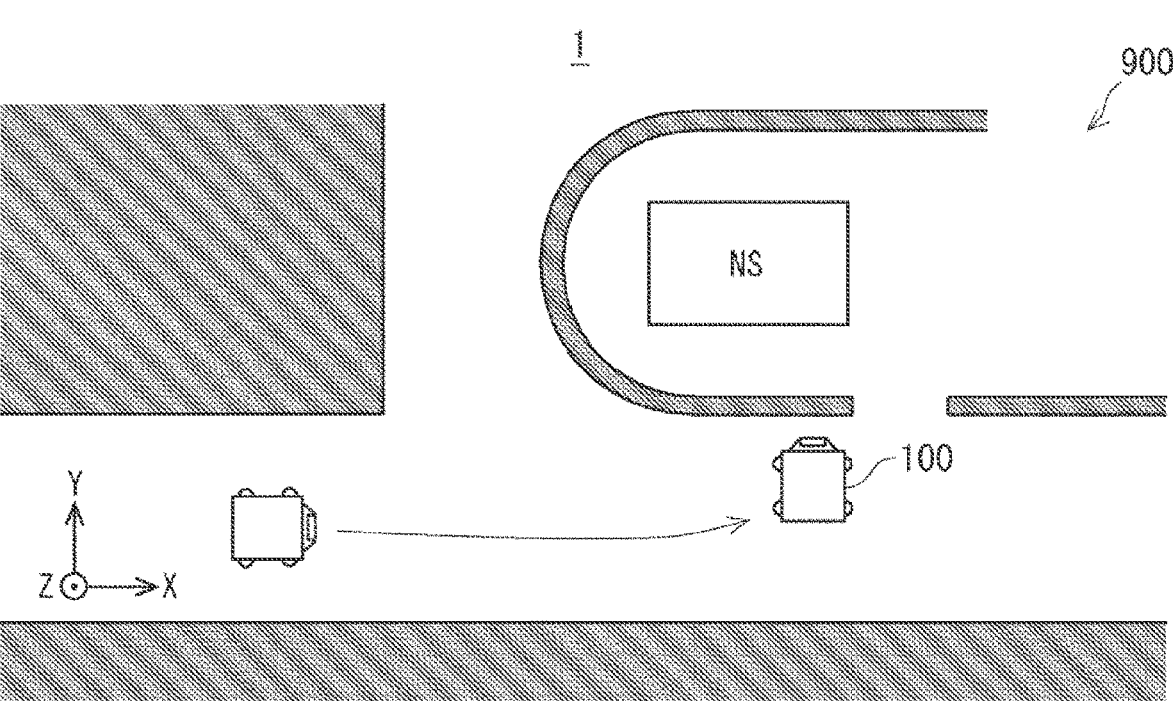
FIG. 1 is a schematic diagram exemplifying an autonomous moving body in an autonomous moving system according to a first embodiment.
Figure 2:
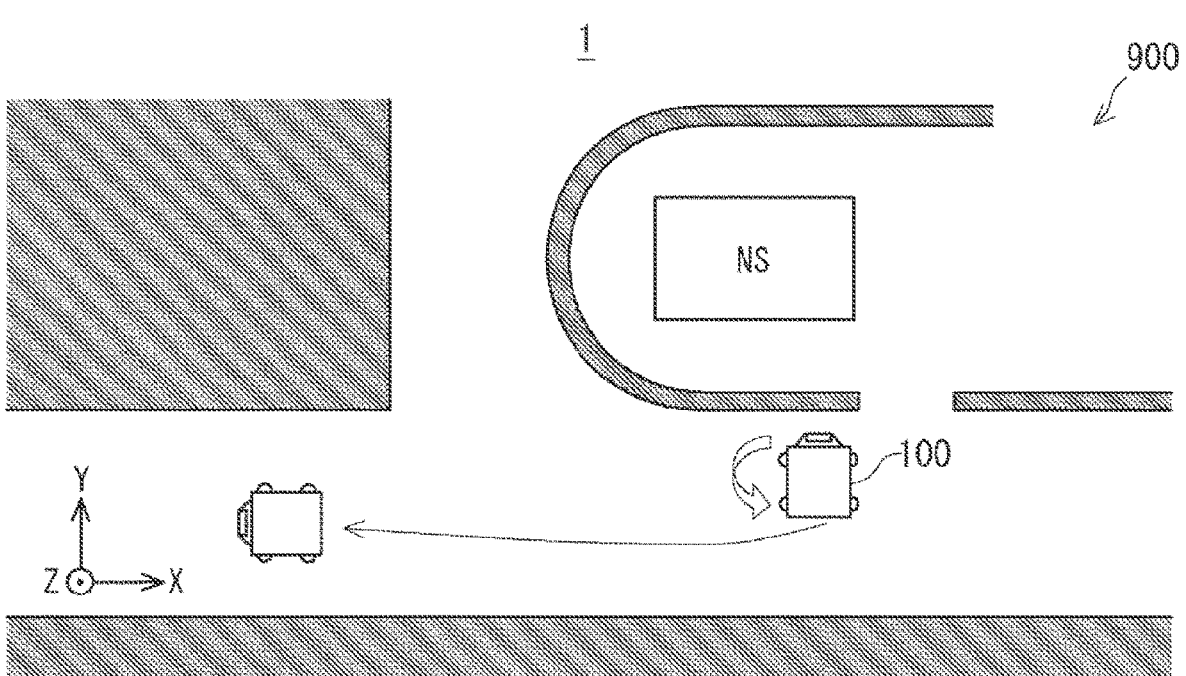
FIG. 2 is a schematic diagram exemplifying the autonomous moving body in the autonomous moving system according to the first embodiment.

FIGS. 1 and 2 are schematic diagrams exemplifying the autonomous moving body in the autonomous moving system according to the first embodiment. As illustrated in FIG. 1, the autonomous moving system 1 includes an autonomous moving body 100 that moves autonomously, and is installed in a predetermined facility space 900. The facility space 900 is, for example, a space within a hospital. Note that the facility space 900 is not limited to a space in a hospital, and may be a space in a rehabilitation center, a nursing care facility, or a residential facility for the elderly, as long as the autonomous moving system 1 is installed in the space. Furthermore, the facility space 900 may be a space such as a business office, a factory, or a warehouse, or a space within a commercial facility such as a shopping mall or the like. The autonomous moving system 1 may be installed not only indoors but also outdoors, such as at a theme park or a tourist spot.

Here, for convenience of description of the autonomous moving system 1, an XYZ orthogonal coordinate axis system will be introduced. For example, a floor surface of the facility space 900 in which the autonomous moving body 100 moves is defined as an XY plane, and a direction perpendicular to the floor surface is defined as a Z-axis direction.

As illustrated in FIGS. 1 and 2, the autonomous moving body 100 moves in the facility space 900. The autonomous moving body 100 is, for example, a transporting robot that executes transporting of a transport item as a task. The autonomous moving body 100 may be an autonomously-traveling vehicle (Automatic Guided Vehicle) that is driven by wheels and travels autonomously. Note that the autonomous moving body 100 may also include moving bodies that are hovercraft type, linear motor, and so forth, that can move other than by being driven by wheels. Also, the autonomous moving body 100 may include not only performing autonomous movement control by the autonomous moving body 100 itself, but also cases in which autonomous traveling is controlled by a control signal or the like that is transmitted from a management device such as an external server or the like.

A user stores a transport item in the autonomous moving body 100 and commissions transportation thereof. The autonomous moving body 100 autonomously moves to a destination that is set, thereby transporting the transport item. When the facility space 900 is a hospital, as illustrated in FIG. 1, the autonomous moving body 100 delivers transport items from a nurses station NS of one clinical department to a nurses station NS of another clinical department. Alternatively, the autonomous moving body 100 delivers transport items from a storeroom for equipment or medical instruments to a nurses station NS of a clinical department. Thereafter, as illustrated in FIG. 2, the autonomous moving body 100 pivots at the nurses station NS and moves from the nurses station NS to another transportation destination. For example, the autonomous moving body 100 delivers medicine that is dispensed to a clinical department or patient at which usage thereof is scheduled. The autonomous moving body 100 may transport equipment, consumables, medical instruments, and so forth, between a plurality of clinical departments.

Examples of the transport items include medicines, consumables such as bandages, specimens, testing instruments, medical instruments, hospital food, equipment such as stationery, and so forth. Examples of the medical equipment include sphygmomanometers, blood transfusion pumps, syringe pumps, foot pumps, nurse call buttons, bed leaving sensors, low-pressure continuous suction devices, electrocardiogram monitors, medication infusion controllers, enteral feeding pumps, ventilators, cuff pressure gauges, touch sensors, inhalers, nebulizers, pulse oximeters, artificial resuscitators, aseptic isolators, ultrasound devices, and so forth. Meals, such as hospital food, food for a special diet a patient follows to prepare for a test, and so forth, may be transported. The autonomous moving body 100 may further transport used equipment, used tableware, and so forth. When the transportation destination is on a different floor, the autonomous moving body 100 may move using an elevator or the like.

Figure 3:
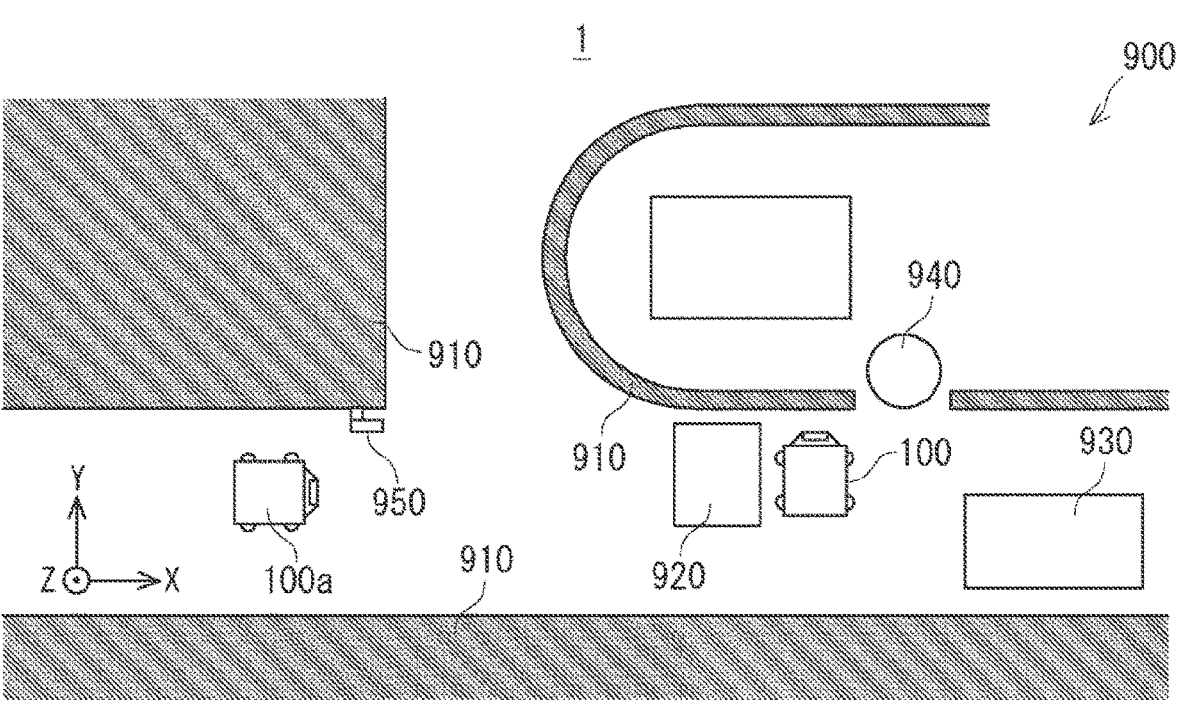
FIG. 3 is a schematic diagram exemplifying a facility space in which the autonomous moving system according to the first embodiment is installed.

FIG. 3 is a schematic diagram exemplifying the facility space 900 in which the autonomous moving system 1 according to the first embodiment is installed. As illustrated in FIG. 3, the facility space 900 may have walls 910. The autonomous moving body 100 may move in a space surrounded by the walls 910. A wheelchair 920 and a stretcher 930 may be placed in the facility space 900. The wheelchair 920 and the stretcher 930 may be moved through the facility space 900, or may be fixed at predetermined positions in the facility space 900. A person 940 may be present in the facility space 900. The person 940 may move through the facility space 900.

A camera unit 950 including one or a plurality of facility cameras, one or a plurality of facility sensors, and so forth, may be installed in the facility space 900. A plurality of autonomous moving bodies 100 and 100a may move through the facility space 900. Although two autonomous moving bodies 100 and 100a are illustrated in FIG. 3, three or more autonomous moving bodies 100, 100a, and so on, may move through the facility space 900. The facility space 900 includes the walls 910, the wheelchair 920, the stretcher 930, and the person 940, which are obstructions to the movement of the autonomous moving body 100. The camera unit 950 acquires information such as images, videos, and so forth, regarding obstructions in the vicinity of the autonomous moving body 100 in the facility space 900.

Figure 4:
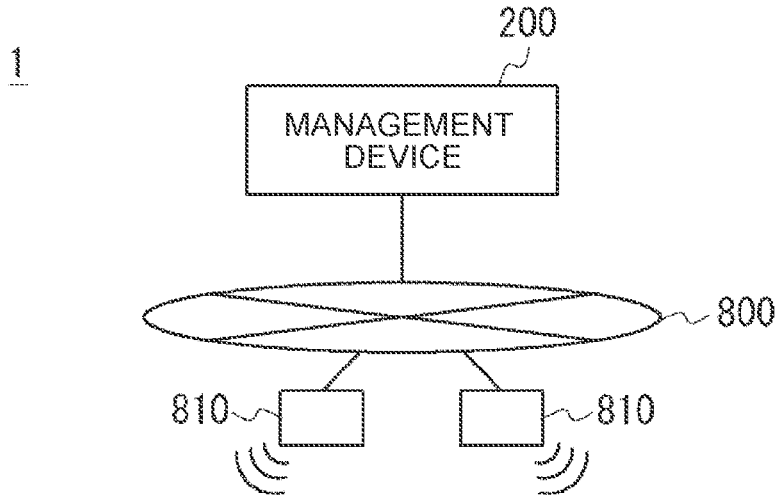
FIG. 4 is a configuration diagram exemplifying the autonomous moving body and a management device in the autonomous moving system according to the first embodiment.
Figure 4:
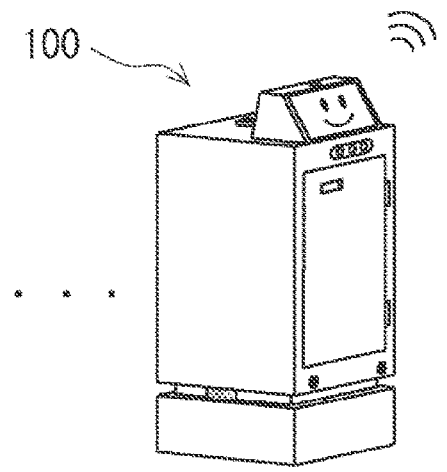
Figure 4:
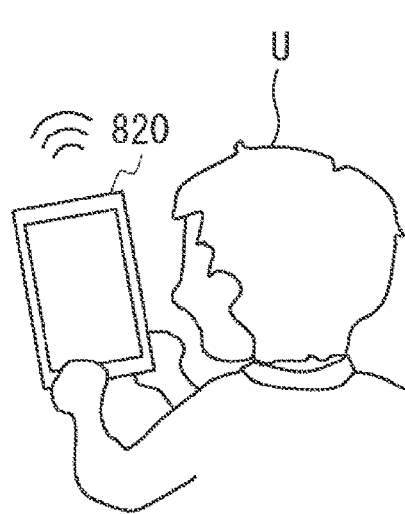

FIG. 4 is a configuration diagram exemplifying the autonomous moving system 1 according to the first embodiment. As illustrated in FIG. 4, the autonomous moving system 1 may include the autonomous moving body 100, a management device 200, a network 800, communication units 810, and a user terminal 820. The autonomous moving system 1 may include a plurality of the user terminals 820, and as described above, may include the autonomous moving bodies 100.

A user U can commission the autonomous moving body 100 to perform transportation of transport items, using the user terminal 820. For example, the user terminal 820 is a tablet computer, a smartphone, or the like. It is sufficient for the user terminal 820 to be an information processing device capable of wireless or wired communication.

In the present embodiment, the autonomous moving body 100 and the user terminal 820 are connected to the management device 200 via the network 800. The autonomous moving body 100 and the user terminal 820 are connected to the network 800 via the communication units 810. The network 800 is a wired or wireless local area network (LAN) or wide area network (WAN). The management device 200 is further connected to the network 800 by wire, or wirelessly. The communication units 810 are wireless LAN units, for example, installed in their respective environments. The communication units 810 may be general-purpose communication devices such as a WiFi router or the like, for example.

Various types of signals, transmitted from the user terminal 820 of the user U, are first sent to the management device 200 via the network 800, and are transferred from the management device 200 to the autonomous moving bodies 100 that are relevant. In the same way, various types of signals, transmitted from the autonomous moving bodies 100, are first sent to the management device 200 via the network 800, and are transferred from the management device 200 to the user terminal 820 that is relevant. The management device 200 may be a server that is connected to each piece of equipment, and that collects data from each piece of equipment. Also, the management device 200 is not limited to being a physically singular device, and may have a plurality of devices performing distributed processing. Further, the management device 200 may be deployed distributed in edge devices of the autonomous moving bodies 100 or the like. For example, part or all of the autonomous moving system 1 may be implemented in the autonomous moving bodies 100.

The user terminals 820 and the autonomous moving bodies 100 may exchange signals without going through the management device 200. For example, the user terminal 820 and the autonomous moving body 100 may directly exchange signals by wireless communication. Alternatively, the user terminals 820 and the autonomous moving bodies 100 may exchange signals via the communication units 810.

Figure 5:
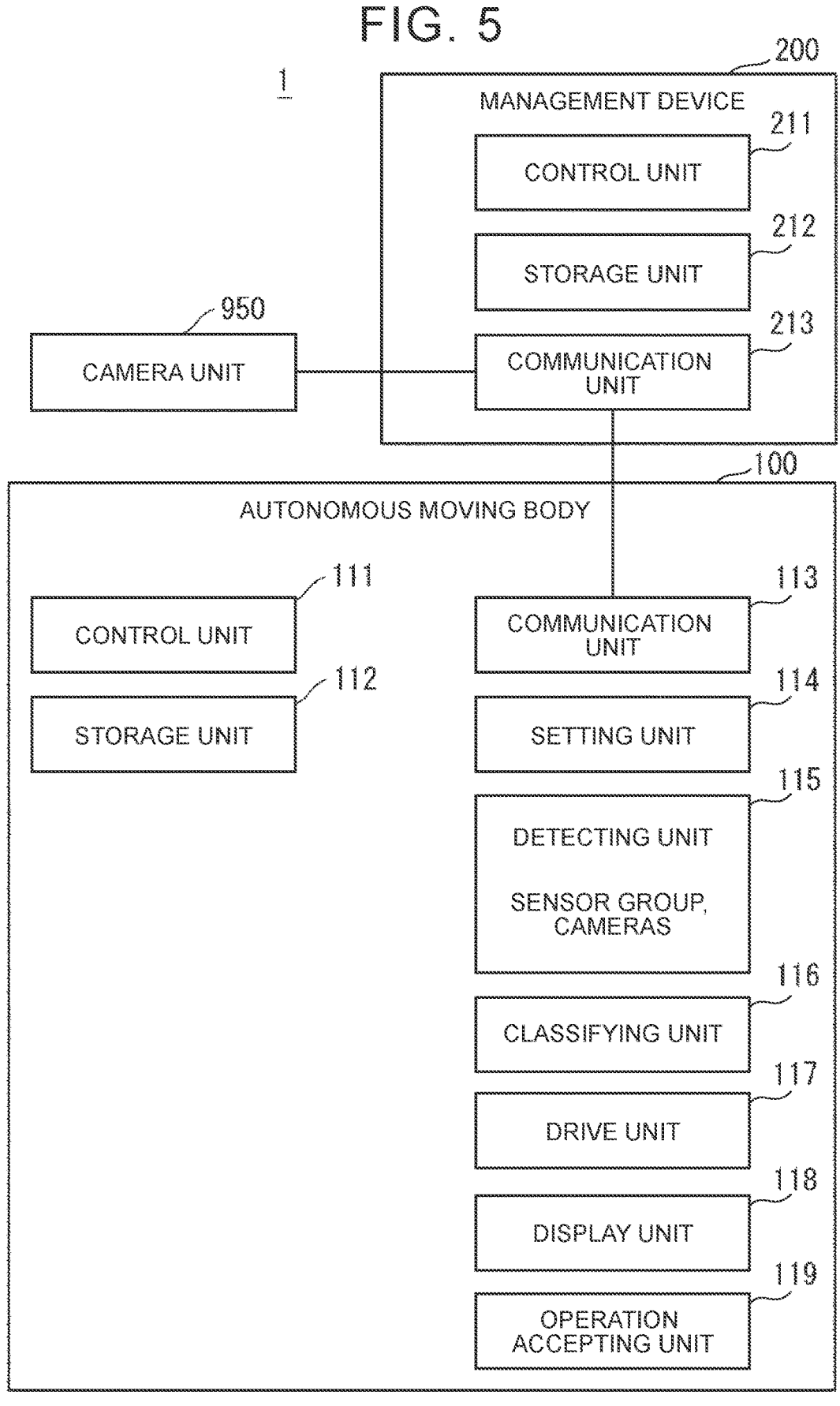
FIG. 5 is a block diagram exemplifying the autonomous moving body and the management device in the autonomous moving system according to the first embodiment.
Figure 6:
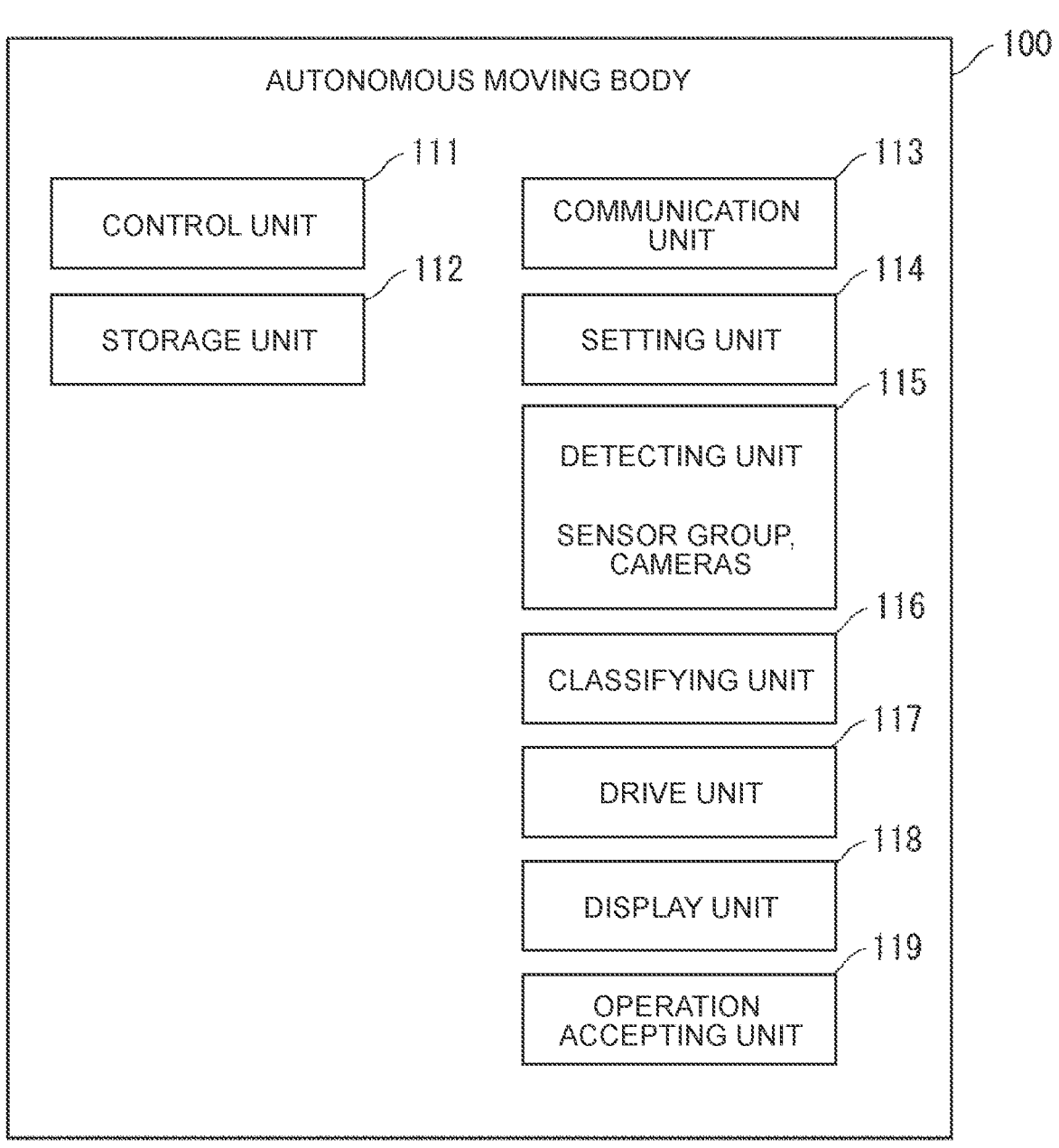
FIG. 6 is a block diagram exemplifying the autonomous moving body in an autonomous moving system according to another example of the first embodiment.

FIG. 5 is a block diagram exemplifying the autonomous moving body 100 and the management device 200 in the autonomous moving system 1 according to the first embodiment. FIG. 6 is a block diagram exemplifying the autonomous moving body 100 in an autonomous moving system 1a according to another example of the first embodiment. As illustrated in FIG. 5, the autonomous moving system 1 may include the autonomous moving body 100 and the management device 200, or as illustrated in FIG. 6, the autonomous moving system 1a may include the autonomous moving body 100 alone.

As illustrated in FIGS. 5 and 6, the autonomous moving body 100 includes a control unit 111, a storage unit 112, a communication unit 113, a setting unit 114, a detecting unit 115, a classifying unit 116, a drive unit 117, a display unit 118, and an operation accepting unit 119. The management device 200 includes a control unit 211, a storage unit 212, and a communication unit 213. Note that FIGS. 5 and 6 illustrate representative processing blocks included in the autonomous moving body 100 and the management device 200. The autonomous moving body 100 and the management device 200 may include other processing blocks that are not illustrated.

The control unit 111 controls the autonomous moving body 100. For example, the control unit 111 controls movement of the autonomous moving body 100. The control unit 111 controls the movement of the autonomous moving body 100, for example, in order to reduce the risk of colliding with an obstruction and to mitigate damage upon a collision. Specifically, the control unit 111 causes the autonomous moving body 100 to move so as to avoid obstructions and not collide therewith. Also, the control unit 111 may control the autonomous moving body 100 to decelerate or to stop. Also, the control unit 111 may control the autonomous moving body 100 to move in the same direction as another autonomous moving body 100. At least one of control to avoid collision with obstructions and control to mitigate damage at the time of a collision is referred to as "collision control". The control unit 111 executes control of movement of the autonomous moving body 100, including collision control. Movement of the autonomous moving body 100 may include the autonomous moving body 100 starting to move.

The control unit 111 has a function of being capable of executing a program, for example, as with a central processing unit (CPU) of a computer or the like. Functions of each part of the autonomous moving body 100 can also be realized by a program.

The storage unit 112 stores various types of data for movement of the autonomous moving body 100. The storage unit 112 stores, for example, data input by the user U, such as a transportation destination of a transport item, or the like. The communication unit 113 communicates with the user terminal 820 and the management device 200, and acquires various types of data from the user terminal 820 and the management device 200.

Figure 7:
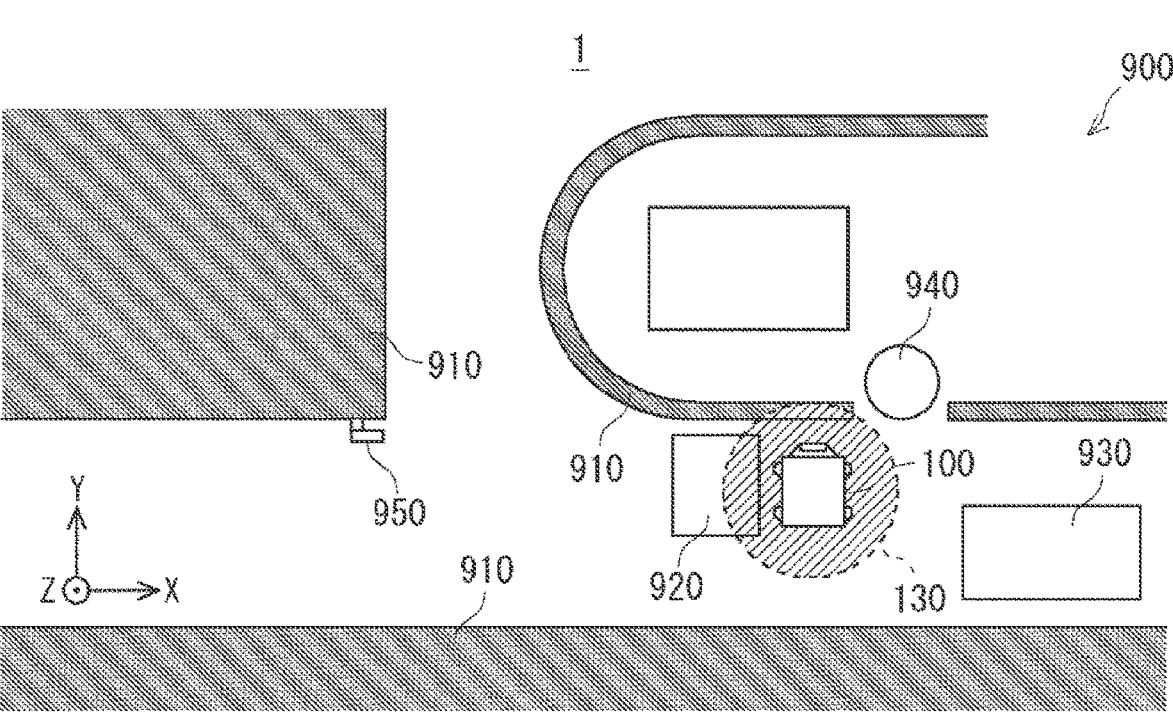
FIG. 7 is a diagram exemplifying a defense space set by a setting unit of the autonomous moving system according to the first embodiment.
Figure 8:
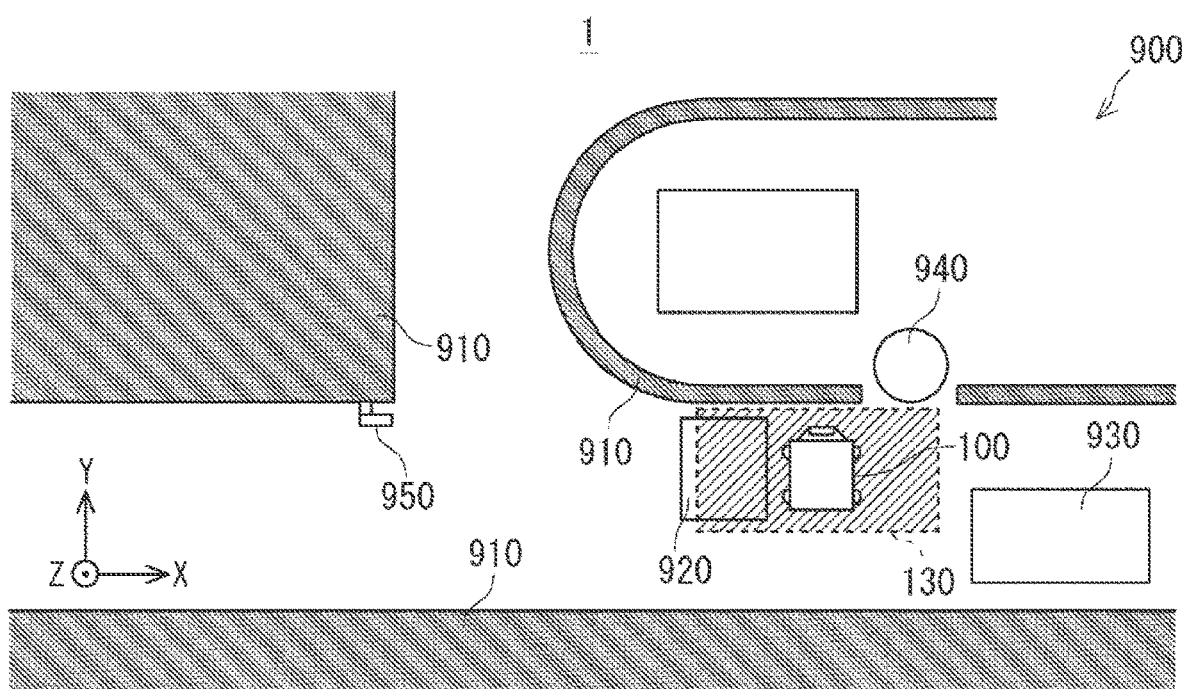
FIG. 8 is a diagram exemplifying the defense space set by the setting unit of the autonomous moving system according to the first embodiment.

The setting unit 114 sets a predetermined defense space around the autonomous moving body 100. FIGS. 7 and 8 are diagrams exemplifying a defense space 130 set by the setting unit 114 of the autonomous moving system 1 according to the first embodiment. As illustrated in FIG. 7, the setting unit 114 sets, for example, the defense space 130, which is cylindrical, around the autonomous moving body

100. The defense space 130 is a space for executing at least one of control for avoiding collision with an obstruction, and control for mitigating damage upon a collision. Specifically, the defense space 130 is a range (space) that is set to execute control to reduce the risk of collision and to mitigate damage upon a collision, when an obstruction enters or is predicted to enter the set range. The defense space 130 is a space in which the control unit 111 executes collision control. The defense space 130 may have a cylindrical shape with a central axis extending in the Z-axis direction. In FIG. 7, the defense space 130 is represented by a columnar space and a columnar space, centered on the autonomous moving body 100, but the size and shape of the space are decided as appropriate in accordance with the facility 900 in which the autonomous moving body 100 is used, the size and movement performance of the autonomous moving body 100, the detection range of the detecting unit 115 and the camera unit 950, and so forth.

Also, as illustrated in FIG. 8, the setting unit 114 may set the defense space 130, which is cuboid-shaped, around the autonomous moving body 100. The defense space 130 may have a cuboid shape surrounding the autonomous moving body 100. Note that the shape of the defense space 130 is not limited to a cylindrical shape or a cuboid shape, and may be other shapes such as a spherical shape or the like that includes the autonomous moving body 100 therein.

The detecting unit 115 detects obstructions in the vicinity of the autonomous moving body 100. The detecting unit 115 may include at least one of a sensor and a camera, which are installed in the autonomous moving body 100. The sensor may be a distance sensor, for example. The detecting unit 115 may include a plurality of sensors. The detection ability of the detecting unit 115 to detect obstructions may extend to the outside of the defense space 130. The detecting unit 115 may detect obstructions by acquiring information such as images and video of the obstructions using the camera or the like. The detecting unit 115 outputs information regarding obstructions that are detected to the classifying unit 116. Note that the autonomous moving system 1 may include the camera unit 950. The camera unit 950 is installed in the facility space 900 through which the autonomous moving body 100 moves. The camera unit 950 may include at least one of a sensor and a camera. The camera unit 950 outputs information regarding obstructions that are detected to the classifying unit 116 via the detecting unit 115, either via the network 800 or directly. Accordingly, the detecting unit 115 may acquire information regarding obstructions from at least one of the sensor and camera installed in the autonomous moving body 100, and the facility sensor and facility camera installed in the facility space 900 through which the autonomous moving body 100 moves. The detecting unit 115 may acquire information regarding obstructions from the camera unit 950, either via the management device 200 or directly.

The classifying unit 116 classifies the obstructions that are detected. The classifying unit 116 acquires information about the obstructions that are detected, from at least one of the detecting unit 115 and the camera unit 950. For example, the classifying unit 116 acquires an image of the obstruction. The classifying unit 116 classifies the obstruction based on information regarding the obstruction that is acquired. The classifying unit 116 classifies the obstruction as being a wall 910, for example. Also, the classifying unit 116 may classify the obstruction as being the wheelchair 920, or as being the stretcher 930. The classifying unit 116 outputs information regarding the obstructions that are classified to the setting unit 114. Further, the classifying unit 116 may output information regarding the obstructions that are classified to the control unit 111.

Also, the classifying unit 116 may have an algorithm that has been subjected to machine learning using obstructions as training data. The classifying unit 116 may classify the obstructions detected by the detecting unit 115 using the algorithm that has been subjected to machine learning.

The defense space 130 is a space provided to defend the autonomous moving body 100 from obstructions. Accordingly, the control unit 111 controls the movement of the autonomous moving body 100 when there is an obstruction within the defense space 130. For example, the control unit 111 may control the autonomous moving body 100 to decelerate, or to stop, as described above. Also, the control unit 111 may control the autonomous moving body 100 to move in the same direction as another autonomous moving body 100. Also, the control unit 111 may predict whether an obstruction will enter into the defense space 130. For example, the control unit 111 may predict whether the obstruction will enter into the defense space 130, based on direction and speed of the movement of the obstruction. Even when prediction is made that an obstruction will enter into the defense space 130, the control unit 111 may control the movement of the autonomous moving body 100 as described above.

As illustrated in FIG. 7, when a wall 910 is included within the defense space 130, the control unit 111 stops the movement of the autonomous moving body 100. Also, as illustrated in FIG. 8, when the wheelchair 920 is included within the defense space 130, the control unit 111 stops the movement of the autonomous moving body 100. When the movement of the autonomous moving body 100 includes starting of the autonomous moving body 100 to move, the control unit 111 stops the autonomous moving body 100 from starting to move. Therefore, when a wall 910 or the wheelchair 920 is included within the defense space 130, the autonomous moving body 100 cannot move from the nurses station NS to another transportation destination such as a hospital room or the like.

Accordingly, in order to cancel such stopping of movement, the autonomous moving body 100 of the present embodiment changes the range of the defense space 130 based on the classification results of obstructions. Specifically, the setting unit 114 changes the range of the defense space 130 based on the obstructions classified by the classifying unit 116. FIGS. 9 to 12 are diagrams exemplifying the range of the defense space 130 that is changed by the setting unit 114 of the autonomous moving system 1 according to the first embodiment.

Figure 9:
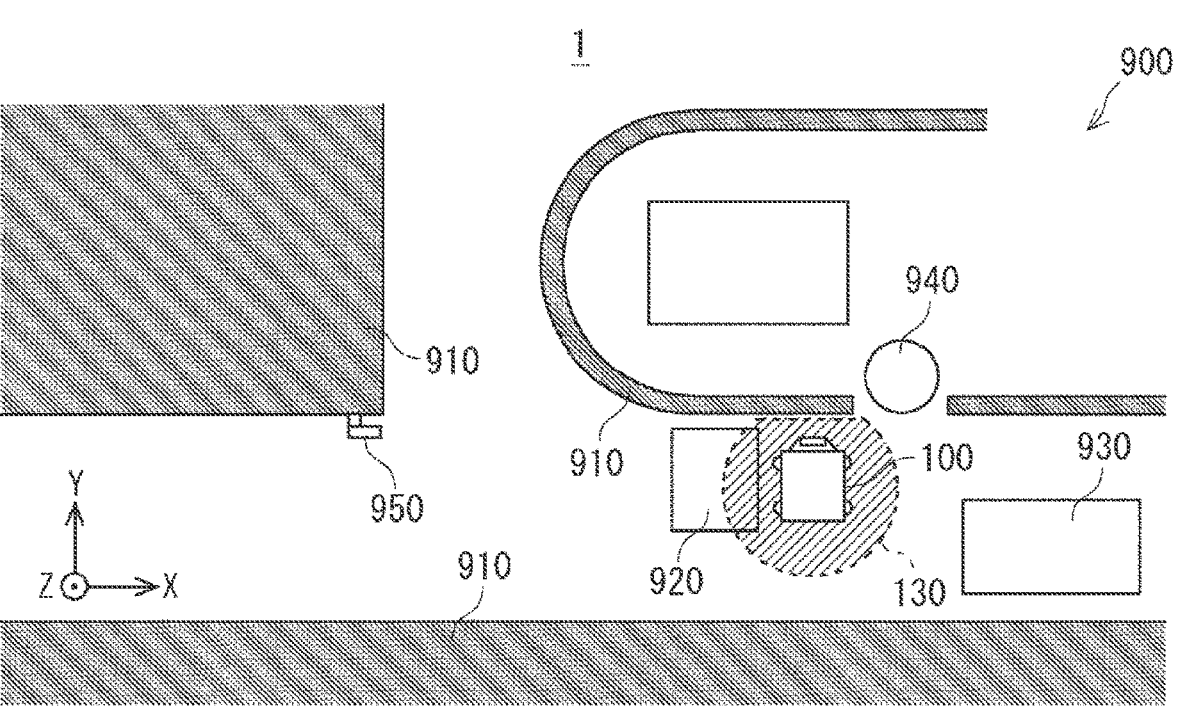
FIG. 9 is a diagram exemplifying a range of the defense space that is changed by the setting unit of the autonomous moving system according to the first embodiment.

As illustrated in FIG. 9, for example, when the classifying unit 116 classifies the obstruction as being a wall 910, the setting unit 114 excludes the portion of the wall 910 of the defense space 130 from the defense space 130. Specifically, the setting unit 114 excludes the portion of the wall 910 from the defense space 130 set around the autonomous moving body 100 so as to perform masking thereof. Thus, the columnar portion of the defense space 130 that overlaps the wall 910, of which the cross-section is an arc, is excluded therefrom. Accordingly, obstructions can be excluded from within the defense space 130, and hence the control unit 111 can cause the autonomous moving body 100 to move. For example, the control unit 111 can start the autonomous moving body 100 to move.

The setting unit 114 may set the portion excluded from the defense space 130 as a movement-prohibited space. The movement-prohibited space may be a space where movement of the autonomous moving body 100 is prohibited. The control unit 111 controls the autonomous moving body 100 so as not to enter the movement-prohibited space. Accordingly, collision of the autonomous moving body 100 with the wall 910 can be suppressed.

Figure 10:
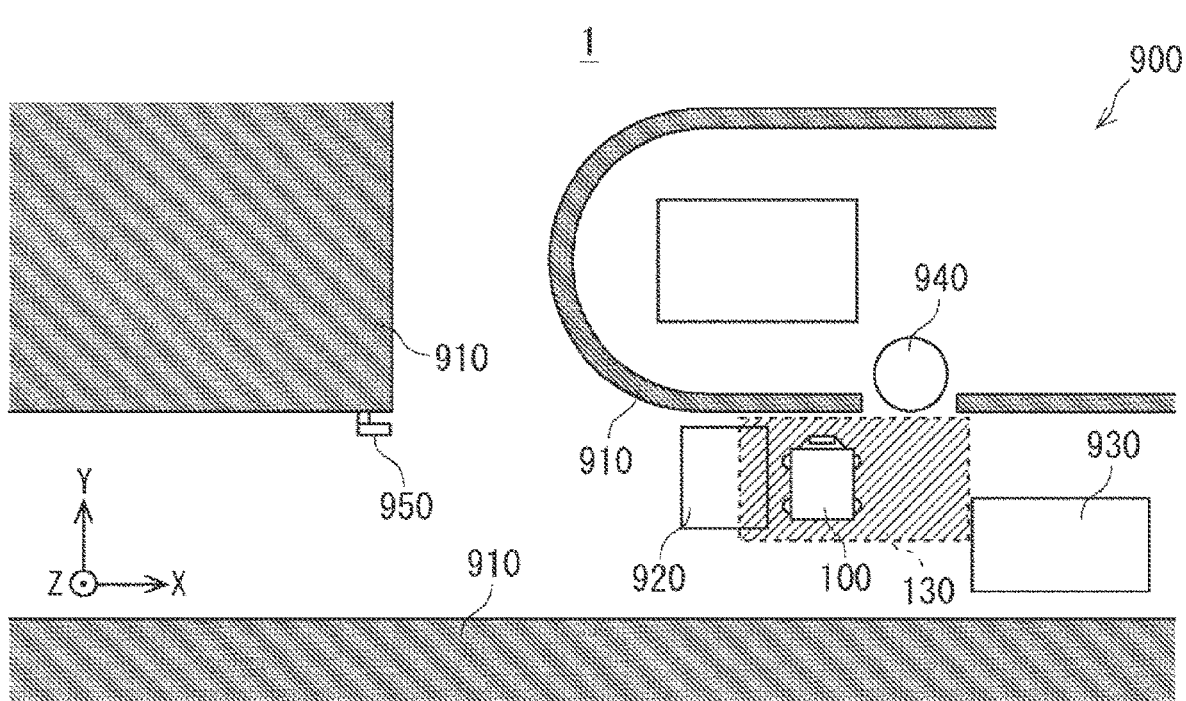
FIG. 10 is a diagram exemplifying the range of the defense space that is changed by the setting unit of the autonomous moving system according to the first embodiment.

As illustrated in FIG. 10, when the classifying unit 116 classifies the obstruction as being the wheelchair 920, the setting unit 114 reduces the width of the defense space 130 on the side thereof toward the wheelchair 920, and increases the width of the defense space 130 on the other side from the wheelchair 920. Specifically, when the wheelchair 920 is located on the minus-X-axial direction side as viewed from the autonomous moving body 100, the setting unit 114 changes the width of the defense space 130 on the minus-X-axial direction side of the autonomous moving body 100 so as to becomes smaller. On the other hand, the setting unit 114 changes the width of the defense space 130 on the plus-X-axial direction side of the autonomous moving body 100 so as to become larger.

Reducing the width of the defense space 130 on the wheelchair 920 side enables the wheelchair 920 to quickly exit from the defense space 130 when the wheelchair 920 moves. Further, when the wheelchair 920 exits the defense space 130, the autonomous moving body 100 pivots or retreats to move away from the wheelchair 920. Therefore, by increasing the width of the defense space 130 on the side opposite to the wheelchair 920, safety on the side opposite to the wheelchair 920 is ensured.

When reducing the width of the defense space 130 on the wheelchair 920 side, the width may be reduced until the wheelchair 920 is no longer in the defense space 130. Thereby, the autonomous moving body 100 can move away from the wheelchair 920 by performing movement such as pivoting or retreating.

Figure 11:
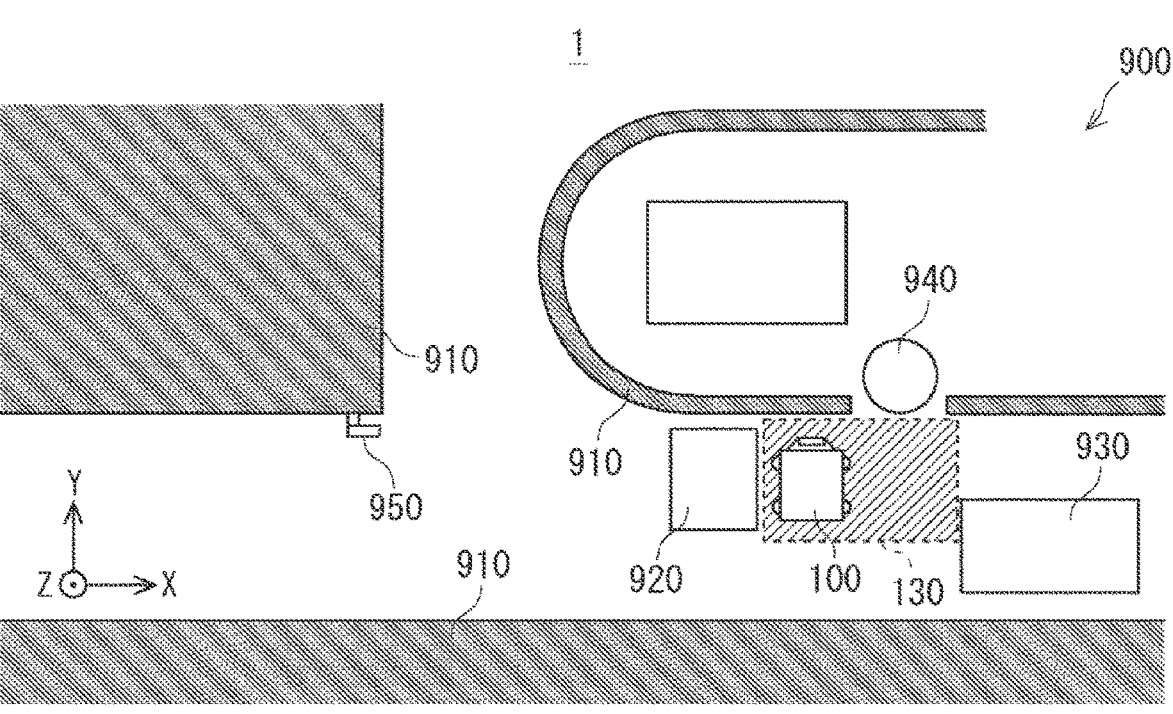
FIG. 11 is a diagram exemplifying the range of the defense space that is changed by the setting unit of the autonomous moving system according to the first embodiment.

As illustrated in FIG. 11, when the classifying unit 116 classifies the obstruction as being a wheelchair 920 that has been stopped for a predetermined period of time, as a result of detection by the detecting unit 115, the setting unit 114 may exclude the portion of the wheelchair 920 that is in the defense space 130 from the defense space 130. Also, when the classifying unit 116 classifies the obstruction as being a wheelchair 920 that a person 940 is riding, the setting unit 114 may exclude the wheelchair 920 portion of the defense space 130 from the defense space 130.

In such a case, the setting unit 114 excludes the portion of the wheelchair 920 from the defense space 130 set around the autonomous moving body 100 so as to perform masking thereof. Thus, the portion of the cuboid that overlaps the wheelchair 920 is excluded from the defense space 130. Accordingly, obstructions can be excluded from within the defense space 130, and hence the control unit 111 can cause the autonomous moving body 100 to move. The setting unit 114 may set the portion excluded from the defense space 130 as the movement-prohibited space.

In particular, when the classifying unit 116 classifies the obstruction as being a wheelchair 920 that a person 940 is riding, the control unit 111 causes the autonomous moving body 100 to move away from the wheelchair 920. Alternatively, the setting unit 114 excludes the portion of the wheelchair 920 in the defense space 130 from the defense space 130, and thereafter the control unit 111 causes the autonomous moving body 100 to move away from the wheelchair 920. Thus, even when the wheelchair 920 that the person 940 is riding moves, the autonomous moving body 100 can be suppressed from colliding with the wheelchair 920.

Figure 12:
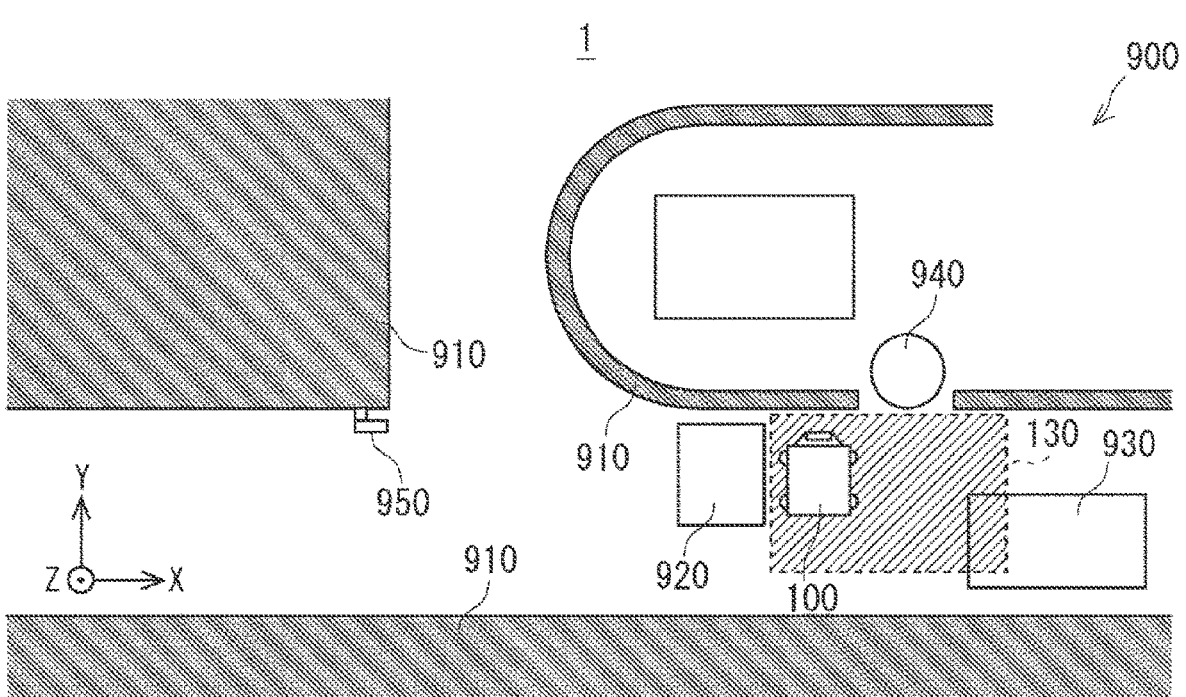
FIG. 12 is a diagram exemplifying the range of the defense space that is changed by the setting unit of the autonomous moving system according to the first embodiment.

As illustrated in FIG. 12, when the classifying unit 116 classifies the obstruction as being a stretcher 930, the setting unit 114 enlarges the defense space 130. Specifically, the setting unit 114 expands the defense space 130 set around the autonomous moving body 100 by a predetermined width in a predetermined direction, for example. For example, the setting unit 114 expands the defense space 130 to the space through which the stretcher 930 will pass, in the direction in which the stretcher 930 will advance. At this time, the setting unit 114 may exclude the wall 910 portion and the stretcher 930 portion of the defense space 130 from the defense space 130.

Movement of the stretcher 930 may be urgent. Accordingly, the speed of movement of the stretcher 930 is fast. The stretcher 930 may also be accompanied by various types of equipment and a person 940 performing treatment. For this reason, it is desirable to have a certain level of leeway in the space between the autonomous moving body 100 and the stretcher 930.

When the classifying unit 116 classifies the obstruction as being the stretcher 930, the setting unit 114 enlarges the defense space 130, so that collision with the stretcher 930 can be suppressed. Note that in such a case, it is desirable that the control unit 111 causes the autonomous moving body 100 to exit the space through which the stretcher 930 will pass, in the direction in which the stretcher 930 will advance. Thus, collision with the stretcher 930 can be further suppressed.

As illustrated in FIG. 5, the management device 200 includes the control unit 211, the storage unit 212, and the communication unit 213. The control unit 211 may control the autonomous moving body 100 in the same way as the control unit 111. Also, the control unit 211 may control movement of multiple autonomous moving bodies 100.

The control unit 211 has a function of being capable of executing a program, for example, as with a CPU of a computer or the like. Functions of each part of the autonomous moving body 100 can also be realized by a program.

The storage unit 212 stores various types of data for movement of the autonomous moving body 100, in the same way as with the storage unit 112. The storage unit 212 stores, for example, data input by the user U, such as the transportation destination of the transport item and so forth. The communication unit 213 acquires data such as images, videos, and so forth, from the camera unit 950. Also, the communication unit 213 exchanges various types of data between the user terminal 820 and the autonomous moving body 100.

Figure 13:
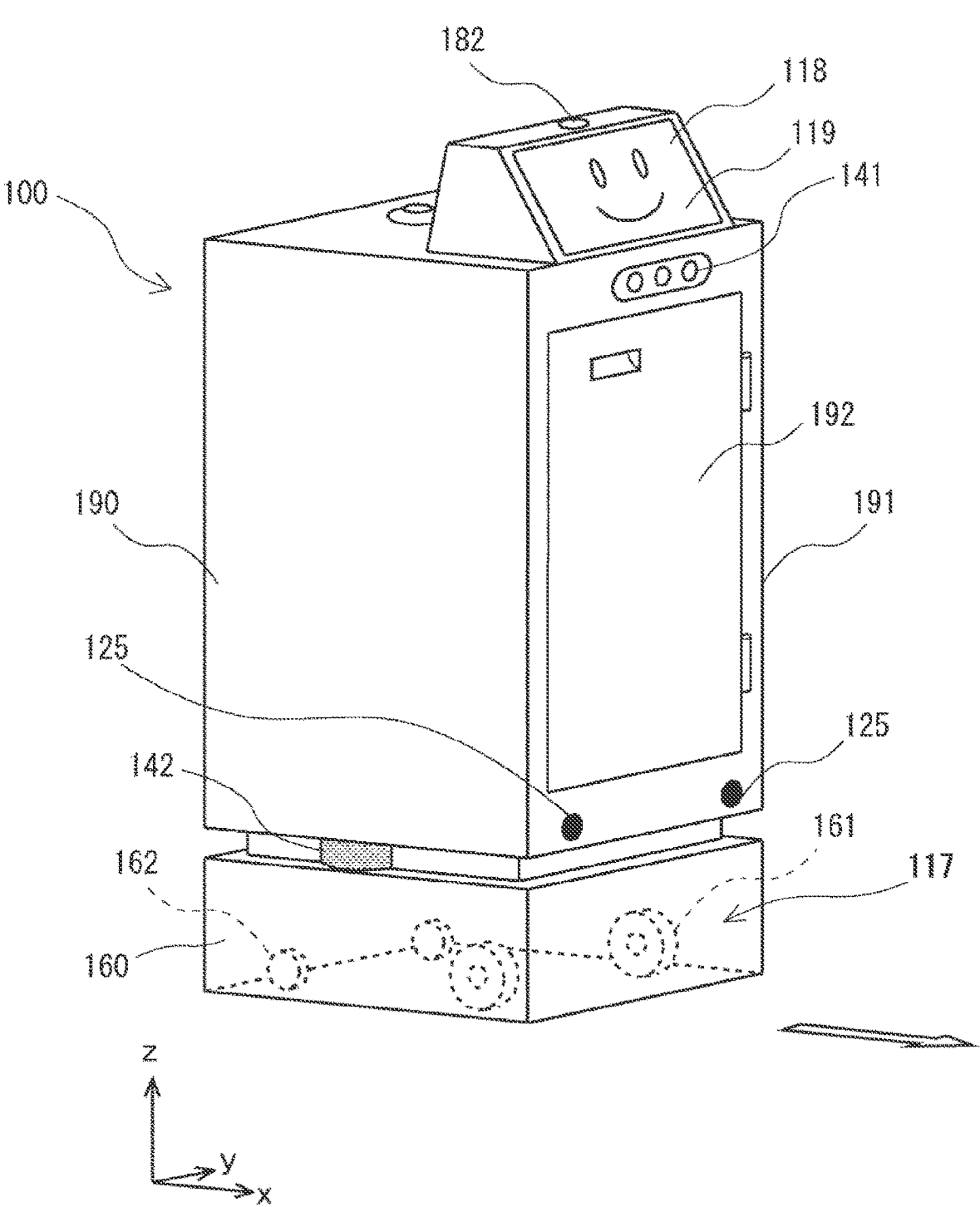
FIG. 13 is a schematic diagram exemplifying the autonomous moving body in the autonomous moving system according to the first embodiment.

Next, the drive unit 117, the display unit 118, and the operation accepting unit 119 will be described with reference to the drawings. FIG. 13 is a schematic diagram exemplifying the autonomous moving body 100 in the autonomous moving system 1 according to the first embodiment. The autonomous moving body 100 illustrated in FIG. 13 is one form of the autonomous moving body 100, and may be in another form. Note that FIG. 13 illustrates the autonomous moving body 100 when a forward direction of the autonomous moving body 100 is the plus-X-axial direction and a rearward direction thereof is the minus-X-axial direction. In this case, the Y-axial direction is a right-left direction of the autonomous moving body 100, and the Z-axial direction is a height direction of the autonomous moving body 100.

The autonomous moving body 100 includes a main body section 190 and a bogie section 160. The main body section 190 is installed on the bogie section 160. The main body section 190 and the bogie section 160 each have a cuboid-shaped housing, and the components are installed inside the housings. For example, the drive unit 117 is housed inside the bogie section 160.

The main body section 190 is provided with storage 191 that serves as a storage space, and a door 192 that closes off the storage 191. The storage 191 is provided with a plurality of shelves, and availability is managed for each shelf. For example, the availability can be updated by providing various types of sensors, such as a weight sensor, in each shelf. The autonomous moving body 100 moves autonomously to transport the transport items stored in the storage 191 to destinations under instruction from the management device 200. The main body section 190 may be equipped with a control box or the like, omitted from illustration, in the housing. Further, the door 192 may be capable of being locked with an electronic key or the like. Upon arriving at the transportation destination, the user U unlocks the door 192 with the electronic key. Alternatively, the door 192 may automatically be unlocked upon arrival at the transportation destination.

As illustrated in FIG. 13, front-rear distance sensors 141 and right-left distance sensors 142 are provided as a sensor group on the exterior of the autonomous moving body 100. The autonomous moving body 100 measures distances to objects in the vicinity in front and rear directions of the autonomous moving body 100, using the front-rear distance sensors 141. Thus, the detecting unit 115 detects obstructions in the vicinity of the autonomous moving body 100 in the front and rear directions. Also, the autonomous moving body 100 measures distances to objects in the vicinity in the right and left directions of the autonomous moving body 100, using the right-left distance sensors 142. Thus, the detecting unit 115 detects obstructions in the vicinity of the autonomous moving body 100 in the right and left directions.

For example, the front-rear distance sensors 141 are provided on each of a front face and a rear face of the housing of the main body section 190. The right-left distance sensors 142 are provided on each of a right side face and a left side face of the housing of the main body section 190. The front-rear distance sensors 141 and the right-left distance sensors 142 are, for example, ultrasonic distance sensors or laser rangefinders.

The drive unit 117 is provided with drive wheels 161 and casters 162. The drive wheels 161 are wheels for moving the autonomous moving body 100 forward, rearward, rightward, and leftward. The casters 162 are driven wheels that roll following the drive wheels 161, without being given driving force. The drive unit 117 includes a drive motor (omitted from illustration) and drives the drive wheels 161.

For example, the drive unit 117 supports, within the housing, two drive wheels 161 and two casters 162, which are each in contact with a traveling surface. The two drive wheels 161 are arranged such that rotation axes thereof match each other. The drive wheels 161 are each independently rotationally driven by a motor that is omitted from illustration. The casters 162 are driven wheels, and follow the moving direction of the drive unit 117.

For example, when the two drive wheels 161 are rotated in the same direction at the same rotation speed, the autonomous moving body 100 travels straight, and when the two drive wheels 161 are rotated in opposite directions at the same rotation speed, the autonomous moving body 100 pivots about a vertical axis extending through the substantial middle between the two drive wheels 161. By rotating the two drive wheels 161 in the same direction at different rotation speeds, the autonomous moving body 100 can travel while turning right or left. For example, the autonomous moving body 100 can make a right turn by making the rotation speed of the left drive wheel 161 to be faster than the rotation speed of the right drive wheel 161. Conversely, the autonomous moving body 100 can make a left turn by making the rotation speed of the right drive wheel 161 to be faster than the rotation speed of the left drive wheel 161. That is to say, the autonomous moving body 100 can travel straight, pivot, turn right or left, and so forth, in any direction, by controlling rotation directions and rotation speeds of the two drive wheels 161.

In the autonomous moving body 100, the display unit 118 and the operation accepting unit 119 are provided on an upper face of the main body section 190. The operation accepting unit 119 is displayed on the display unit 118. The operation accepting unit 119 can receive instructions input from the user by the user performing a touch operation on the operation accepting unit 119 displayed on the display unit 118. An emergency stop button 182 may be provided on an upper face of the display unit 118.

The display unit 118 is, for example, a liquid crystal panel that displays an illustration of a face of a character, presents information regarding the autonomous moving body 100 in text or by icons, and so forth. Displaying the face of the character on the display unit 118 can give observers in the surroundings an impression that the display unit 118 is a pseudo face portion. The display unit 118 and so forth that are installed in the autonomous moving body 100 can also be used as the user terminal 820.

Cameras 125 are installed on the front face of the main body section 190. Here, two cameras 125 function as a stereo camera. That is to say, the two cameras 125 having the same angle of view are provided away from each other in a horizontal direction. Images captured by each of the cameras 125 is output as image data. Distance to a subject, and the size of the subject, can be calculated based on the image data from the two cameras 125. The classifying unit 116 can classify obstructions by analyzing images taken by the cameras 125. When there are people, obstructions, or the like, at positions forward in the direction of advance, the autonomous moving body 100 moves along the route while avoiding them. Also, the image data from the cameras 125 may be transmitted to the management device 200.

Next, an autonomous moving method for the autonomous moving body 100 will be described. FIG. 14 is a flowchart exemplifying the autonomous moving method for the autonomous moving body 100 according to the first embodiment.

As shown in step S11 in FIG. 14, a predetermined defense space 130 is set around the autonomous moving body 100. Specifically, the setting unit 114 sets a predetermined defense space 130 in a cylindrical shape, a cuboid shape, or the like, around the autonomous moving body 100.

Next, as shown in step S12, obstructions in the vicinity of the autonomous moving body 100 are detected. Specifically, the detecting unit 115 is caused to detect obstructions in the vicinity of the autonomous moving body 100. Note that the camera unit 950, such as a facility camera or the like, may detect obstructions in the vicinity of the autonomous moving body 100.

Next, as shown in step S13, the obstructions that are detected are classified. Specifically, the classifying unit 116 is caused to classify the obstructions that are detected. The classifying unit 116 may classify the obstructions using an algorithm that is subjected to by machine learning using the obstructions as training data.

Next, as shown in step S14, the range of the defense space 130 is changed based on the obstructions that are classified. Specifically, the setting unit 114 changes the range of the defense space 130 based on the obstructions that are classified by the classifying unit 116.

Next, as shown in step S15, determination is made regarding whether there is an obstruction inside the defense space 130. Specifically, the control unit 111 makes the determination. Note that the control unit 111 may predict whether an obstruction will enter into the defense space 130. In step S15, when there is an obstruction inside the defense space 130 or when a prediction is made that the obstruction will enter into the defense space 130 (YES in step S15), movement of the autonomous moving body 100 is controlled, as shown in step S16. The movement of the autonomous moving body 100 includes the autonomous moving body 100 starting to move, and the control unit 111 may stop the autonomous moving body 100 from starting to move, based on the obstructions that are classified. The flow then advances to step S18.

On the other hand, when there is no obstruction inside the defense space 130 in step S15 (NO in step S15), the control unit 111 causes the autonomous moving body 100 to move, as shown in step S17. The flow then advances to step S18.

Next, as shown in step S18, the control unit 111 determines whether to end the flow. When the processing is not to be ended, due to the task such as transporting articles or the like not having been completed, or a predetermined amount of time not having elapsed or the like (NO in step S18), the flow returns to step S12, and steps S12 to S18 are repeated.

On the other hand, when the processing is to be ended in step S18, due to the task such as transporting articles or the like having been completed, or a predetermined amount of time having elapsed or the like (YES in step S18), the processing ends.

The autonomous moving method according to the present embodiment may be performed by the autonomous moving body 100 alone, or may be performed by the management device 200. Also, the autonomous moving body 100 and the management device 200 may collaboratively execute the autonomous moving method.

Next, effects of the present embodiment will be described. The autonomous moving system 1 according to the present embodiment detects obstructions in the vicinity of the autonomous moving body 100 and classifies the obstructions that are detected. The autonomous moving system 1 then changes the range of the defense space 130 based on the obstructions that are classified. Accordingly, even when there is an obstruction in the defense space 130 of the autonomous moving body 100, the autonomous moving system 1 can exclude the obstruction from the defense space 130 by changing the range of the defense space 130 based on the obstruction. Thus, the autonomous moving body 100 can be made to move. In this way, the autonomous moving system 1 can change actions depending on the situation in the vicinity of the autonomous moving body 100, and can cause the autonomous moving body 100 to safely move.

Movement of the autonomous moving body 100 may include the autonomous moving body 100 starting to move. Accordingly, the autonomous moving system 1 can safely start the autonomous moving body 100 to move, in accordance with the situation in the vicinity of the autonomous moving body 100.

When detecting obstructions in the vicinity of the autonomous moving body 100, sensors and cameras installed in the autonomous moving body 100 may be used, or facility sensors and facility cameras installed in the facility space 900 may be used. Obstructions can be detected from multiple angles, and the autonomous moving body 100 can be made to move more safely.

Obstructions may be classified using an algorithm that has been subjected to machine learning. The precision of classifying obstructions can be improved.

Deciding the actions of the autonomous moving body 100 when the classifying unit 116 classifies obstructions into walls 910, wheelchairs 920, and stretchers 930, enables the actions to be changed depending on the situation. Thus, the autonomous moving body 100 can be made to move safely.

Second Embodiment

Next, an autonomous moving system according to a second embodiment will be described. The autonomous moving system according to the present embodiment uses map information of the facility space 900.

The storage unit 112 stores the map information of the facility space 900. The map information includes, for example, a floor map of the facility space 900. The floor map may be created in advance, may be generated from information obtained from the autonomous moving body 100, or may be created by adding information obtained from the autonomous moving body 100 to a basic floor map created in advance. The floor map includes information on positions and layout of walls 910, gates, doors, stairs, elevators, fixed shelves, and so forth, in the facility space 900. The floor map may be expressed as a two-dimensional grid map. In this case, information regarding the walls 910, doors, and so forth, is associated with each grid in the floor map.

The setting unit 114 may change the range of the defense space 130 based on the map information acquired from the storage unit 112. When the setting unit 114 acquires the map information of the walls 910 from the storage unit 112, the setting unit 114 excludes the portion of the walls 910 in the acquired map information from the defense space 130. Thus, acquiring obstructions in the facility space 900 from the storage unit 112 enables detection by the detecting unit 115 and classification by the classifying unit 116 to be omitted, and smooth movement of the autonomous moving body 100 can be facilitated.

Also, the classifying unit 116 may classify obstructions based on the map information acquired from the storage unit 112. When the classifying unit 116 acquires the map information of the walls 910 from the storage unit 112, the classifying unit 116 compares the positions of obstructions that are detected with the positions of the walls 910 in the map information. When the two match, the classifying unit 116 classifies the obstructions as being walls 910. In this way, acquiring the map information in the facility space 900 from the storage unit 112 enables precision of classifying obstructions to be improved.

The map information is not limited to being stored in the storage unit 112 of the autonomous moving body 100 and may be stored in the storage unit 212 of the management device 200. The setting unit 114 and the classifying unit 116 may acquire map information from the storage unit 212 of the management device 200.

While embodiments of the present disclosure have been described above, the present disclosure includes modifications that are made appropriately and that do not diminish the object and advantages thereof, and is not limited by the above embodiments. A combination of the configurations of the first embodiment and the second embodiment is also encompassed by the scope of the technical idea of the present embodiment. Also, the autonomous moving method described below, an autonomous moving program described below that causes a computer to execute the autonomous moving method, are also encompassed by the scope of the technical idea of the present embodiment.

Part or all of the processing in the management device 200, the autonomous moving body 100, and so forth, that are described above, can be realized as a computer program. Such a program can be stored using various types of non-transitory computer-readable media, and supplied to a computer. The non-transitory computer-readable media include various types of tangible recording media. Examples of the non-transitory computer-readable media include magnetic recording media (e.g., flexible disks, magnetic tape, hard disk drives), magneto-optical recording media (e.g., magneto-optical disks), compact disc read-only memory (CD-ROM), compact disc recordable (CD-R), compact disc rewritable (CD-R/W), and semiconductor memory (e.g., mask ROM, programmable ROM (PROM), erasable PROM (EPROM), flash ROM, and random access memory (RAM)). The program may also be supplied to the computer by various types of transitory computer-readable media. Examples of the transitory computer-readable media include electrical signals, optical signals, and electromagnetic waves. The transitory computer-readable media can supply the program to the computer via wired communication paths such as electric wires optical fibers, and so forth, or a wireless communication path.

(Appendix 1) An autonomous moving method for an autonomous moving body that moves autonomously, the autonomous moving method including setting a predetermined defense space around the autonomous moving body, for executing collision control of at least one of control to avoid a collision between the autonomous moving body and an obstruction and control to mitigate damage upon a collision, detecting an obstruction in a vicinity of the autonomous moving body, classifying the obstruction that is detected, changing a range of the defense space based on the obstruction that is classified, and executing control of movement of the autonomous moving body including the collision control in at least one of when the obstruction is inside the defense space and when the obstruction is predicted to enter inside the defense space.

(Appendix 2) The autonomous moving method according to Appendix 1, wherein the movement of the autonomous moving body includes the autonomous moving body starting to move, and in stopping the autonomous moving body from moving, the autonomous moving body is stopped from starting to move, based on the obstruction that is classified.

(Appendix 3) The autonomous moving method according to Appendix 1, wherein, in the detecting of the obstruction in the vicinity of the autonomous moving body, the obstruction in the vicinity of the autonomous moving body is caused to be detected using at least one of a sensor and a camera installed in the autonomous moving body, and a facility sensor and a facility camera installed in a facility space through which the autonomous moving body moves.

(Appendix 4) The autonomous moving method according to Appendix 1, wherein, in the classifying of the obstruction that is detected, the obstruction that is detected is caused to be classified by using an algorithm that is subjected to machine learning using the obstruction as training data.

(Appendix 5) The autonomous moving method according to Appendix 1, wherein, in the classifying of the obstruction that is detected, when the obstruction is classified as a wall, a portion of the wall of the defense space is excluded from the defense space, in the changing of the range of the defense space.

(Appendix 6) The autonomous moving method according to Appendix 1, wherein, in the classifying of the obstruction that is detected, when the obstruction is classified as a wheelchair, a width of the defense space on a wheelchair side is reduced, and the width of the defense space on an opposite side from the wheelchair is increased, in the changing of the range of the defense space.

(Appendix 7) The autonomous moving method according to Appendix 6, wherein, in the classifying of the obstruction that is detected, when the obstruction is classified as the wheelchair in a state of being stopped for a predetermined amount of time, a portion of the wheelchair of the defense space is excluded from the defense space, in the changing of the range of the defense space.

(Appendix 8) The autonomous moving method according to Appendix 6, further including, when the obstruction is classified as the wheelchair that a person is riding in the classifying of the obstruction that is detected, causing the autonomous moving body to move away from the wheelchair.

(Appendix 9) The autonomous moving method according to Appendix 1, further including, when the obstruction is classified as a stretcher in the classifying of the obstruction that is detected, enlarging the defense space, and causing the autonomous moving body to move out of a space through which the stretcher passes, in a direction in which the stretcher advances, in the changing of the range of the defense space.

(Appendix 10) The autonomous moving method according to Appendix 1, further including storing map information of a facility space through which the autonomous moving body moves, and in the classifying of the obstruction that is detected, causing the obstruction to be classified based on the map information.

(Appendix 11) A storage medium storing instructions that are executable by one or more processors and that cause the one or more processors to perform functions including setting a predetermined defense space around the autonomous moving body, for executing collision control of at least one of control to avoid a collision between the autonomous moving body and an obstruction and control to mitigate damage upon a collision, detecting an obstruction in a vicinity of the autonomous moving body, classifying the obstruction that is detected, changing a range of the defense space based on the obstruction that is classified, and executing control of movement of the autonomous moving body including the collision control in at least one of when the obstruction is inside the defense space and when the obstruction is predicted to enter inside the defense space.

(Appendix 12) The storage medium according to Appendix 11, wherein the movement of the autonomous moving body includes the autonomous moving body starting to move, and in stopping the autonomous moving body from moving, the autonomous moving body is stopped from starting to move, based on the obstruction that is classified.

(Appendix 13) The storage medium according to Appendix 11, wherein, in the detecting of the obstruction in the vicinity of the autonomous moving body, the obstruction in the vicinity of the autonomous moving body is caused to be detected using at least one of a sensor and a camera installed in the autonomous moving body, and a facility sensor and a facility camera installed in a facility space through which the autonomous moving body moves.

(Appendix 14) The storage medium according to Appendix 11, wherein, in the classifying of the obstruction that is detected, the obstruction that is detected is caused to be classified by using an algorithm that is subjected to machine learning using the obstruction as training data.

(Appendix 15) The storage medium according to Appendix 11, wherein, in the classifying of the obstruction that is detected, when the obstruction is classified as a wall, the portion of the wall of the defense space is excluded from the defense space, in the changing of the range of the defense space.

(Appendix 16) The storage medium according to Appendix 11, wherein, in the classifying of the obstruction that is detected, when the obstruction is classified as a wheelchair, a width of the defense space on a wheelchair side is reduced, and the width of the defense space on an opposite side from the wheelchair is increased, in the changing of the range of the defense space.

(Appendix 17) The storage medium according to Appendix 16, wherein, in the classifying of the obstruction that is detected, when the obstruction is classified as the wheelchair in a state of being stopped for a predetermined amount of time, the portion of the wheelchair of the defense space is excluded from the defense space, in the changing of the range of the defense space.

(Appendix 18) The storage medium according to Appendix 16, further including, when the obstruction is classified as the wheelchair that a person is riding in the classifying of the obstruction that is detected, causing the autonomous moving body to move away from the wheelchair.

(Appendix 19) The storage medium according to Appendix 11, further including, when the obstruction is classified as a stretcher in the classifying of the obstruction that is detected, enlarging the defense space, and causing the autonomous moving body to move out of a space through which the stretcher passes, in a direction in which the stretcher advances, in the changing of the range of the defense space.

(Appendix 20) The storage medium according to Appendix 11, further including storing map information of a facility space through which the autonomous moving body moves, and in the classifying of the obstruction that is detected, causing the obstruction to be classified based on the map information.

(Appendix 21) The autonomous moving method according to Appendix 1, wherein a range in which obstructions are detectable in the vicinity of the autonomous moving body is a range that is wider than the defense space.

(Appendix 22) The storage medium according to Appendix 11, wherein a range in which obstructions are detectable in the vicinity of the autonomous moving body is a range that is wider than the defense space.

What is claimed is:

1. An autonomous moving system including an autonomous moving body that moves autonomously, the autonomous moving system comprising:
a sensor;
a camera; and
a processor programmed to:
execute control of movement of the autonomous moving body, including collision control of at least one of control to avoid a collision between the autonomous moving body and an obstruction and control to mitigate damage upon a collision;
set a predetermined defense space around the autonomous moving body, for executing the collision control by setting a size and a shape of the predetermined defense space in accordance with a facility in which the autonomous moving body is used, a size and movement performance of the autonomous moving body, and a detection range of the sensor and the camera;

based on information from the sensor and camera, detect an obstruction in a vicinity of the autonomous moving body; and classify the obstruction that is detected;

in a case where the obstruction is within the predetermined defense space, change the size and the shape of the predetermined defense space by excluding the obstruction from the predetermined defense space based on the classified obstruction by masking a portion of the predetermined defense space that corresponds to the obstruction;

in response to the changing of the size and the shape of the predetermined defense space, cause the autonomous moving body to be released from stopping and to move; and execute control of movement of the autonomous moving body including the collision control when at least one of the obstruction is inside the defense space and when the obstruction is predicted to enter inside the defense space.

2. The autonomous moving system according to claim 1, wherein the processor is programmed to stop the autonomous moving body from starting to move, based on the classified obstruction.

3. The autonomous moving system according to claim 1, wherein the processor is programmed to detect the obstruction based on a facility sensor and a facility camera installed in a facility space through which the autonomous moving body moves.

4. The autonomous moving system according to claim 1, wherein the processor is programmed to classify the detected obstruction, by using an algorithm that is subjected to machine learning using the obstruction as training data.

5. The autonomous moving system according to claim 1, wherein, when the processor is programmed to:

classify the obstruction as a wall; and exclude a portion of the wall of the defense space from the defense space.

6. The autonomous moving system according to claim 5, wherein the processor is programmed to exclude a columnar portion of the defense space that overlaps the wall, so that the excluded part has a cross-section of an arc.

7. The autonomous moving system according to claim 1, wherein the processor is programmed to, when the obstruction is classified as a wheelchair, reduce a width of the defense space on a wheelchair side, and increase the width of the defense space on an opposite side from the wheelchair.

8. The autonomous moving system according to claim 7, wherein the processor is programmed to, when the obstruction is classified as the wheelchair in a state of being stopped for a predetermined amount of time, exclude a portion of the wheelchair of the defense space from the defense space.

9. The autonomous moving system according to claim 8, exclude a portion of a cuboid that overlaps the wheelchair from the defense space.

10. The autonomous moving system according to claim 7, wherein the processor is programmed to, when the obstruction is classified as the wheelchair that a person is riding, cause the autonomous moving body to move away from the wheelchair.

11. The autonomous moving system according to claim 1, wherein the processor is programmed to, when the obstruction is classified as a stretcher, enlarge the defense space, and cause the autonomous moving body to move out of a space through which the stretcher passes, in a direction in which the stretcher advances.

12. The autonomous moving system according to claim 1, further comprising: a memory storing map information of a facility space through which the autonomous moving body moves, wherein the processor is programmed to classify the obstruction that is detected, based on the stored map information.

13. The autonomous moving system according to claim 1, wherein at least one of the sensor and camera are configured to detect obstructions in the vicinity of the autonomous moving body in a range that is wider than the defense space.

14. An autonomous moving method for an autonomous moving body that moves autonomously, the autonomous moving method comprising:

setting a predetermined defense space around the autonomous moving body, for executing collision control of at least one of control to avoid a collision between the autonomous moving body and an obstruction and control to mitigate damage upon a collision by setting a size and a shape of the predetermined defense space in accordance with a facility in which the autonomous moving body is used, a size and movement performance of the autonomous moving body, and a detection range of a sensor and a camera installed on the autonomous moving body;

based on information from the sensor and camera, detecting an obstruction in a vicinity of the autonomous moving body;

classifying the obstruction that is detected;

in a case where the obstruction is within the predetermined defense space, changing the size and the shape of the predetermined by excluding the obstruction from the predetermined defense space based on the classified obstruction by masking a portion of the predetermined defense space that corresponds to the obstruction;

in response to the changing of the size and the shape of the predetermined defense space, cause the autonomous moving body to be released from stopping and to move; and executing control of movement of the autonomous moving body including the collision control when at least one of the obstruction is inside the defense space and when the obstruction is predicted to enter inside the defense space.

15. A non-transitory storage medium storing instructions that are executable by one or more processors and that cause the one or more processors to perform functions comprising:

setting a predetermined defense space around an autonomous moving body, for executing collision control of at least one of control to avoid a collision between the autonomous moving body and an obstruction and control to mitigate damage upon a collision by setting a size and a shape of the predetermined defense space in accordance with a facility in which the autonomous moving body is used, a size and movement performance of the autonomous moving body, and a detection range of a sensor and a camera installed on the autonomous moving body;

based on information from the sensor and camera, detecting an obstruction in a vicinity of the autonomous moving body;

classifying the obstruction that is detected;

in a case where the obstruction is within the predetermined defense space, changing the size and the shape of the predetermined by excluding the obstruction from the predetermined defense space based on the classified obstruction by masking a portion of the predetermined defense space that corresponds to the obstruction;

in response to the changing of the size and the shape of the predetermined defense space, cause the autonomous moving body to be released from stopping and to move; and executing control of movement of the autonomous moving body including the collision control when at least one of the obstruction is inside the defense space and when the obstruction is predicted to enter inside the defense space.

* * * * *